UNITED STATES PATENT OFFICE.

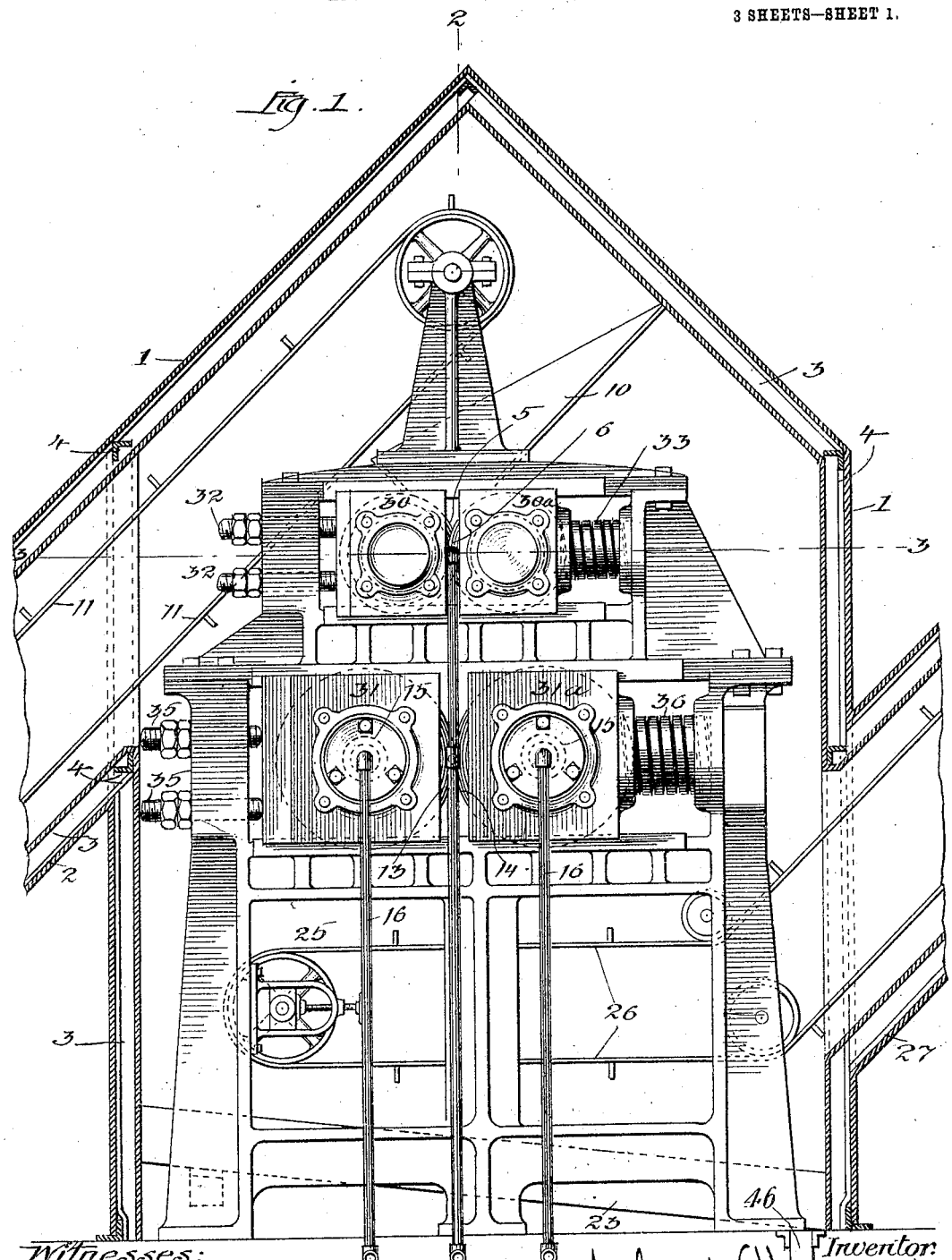

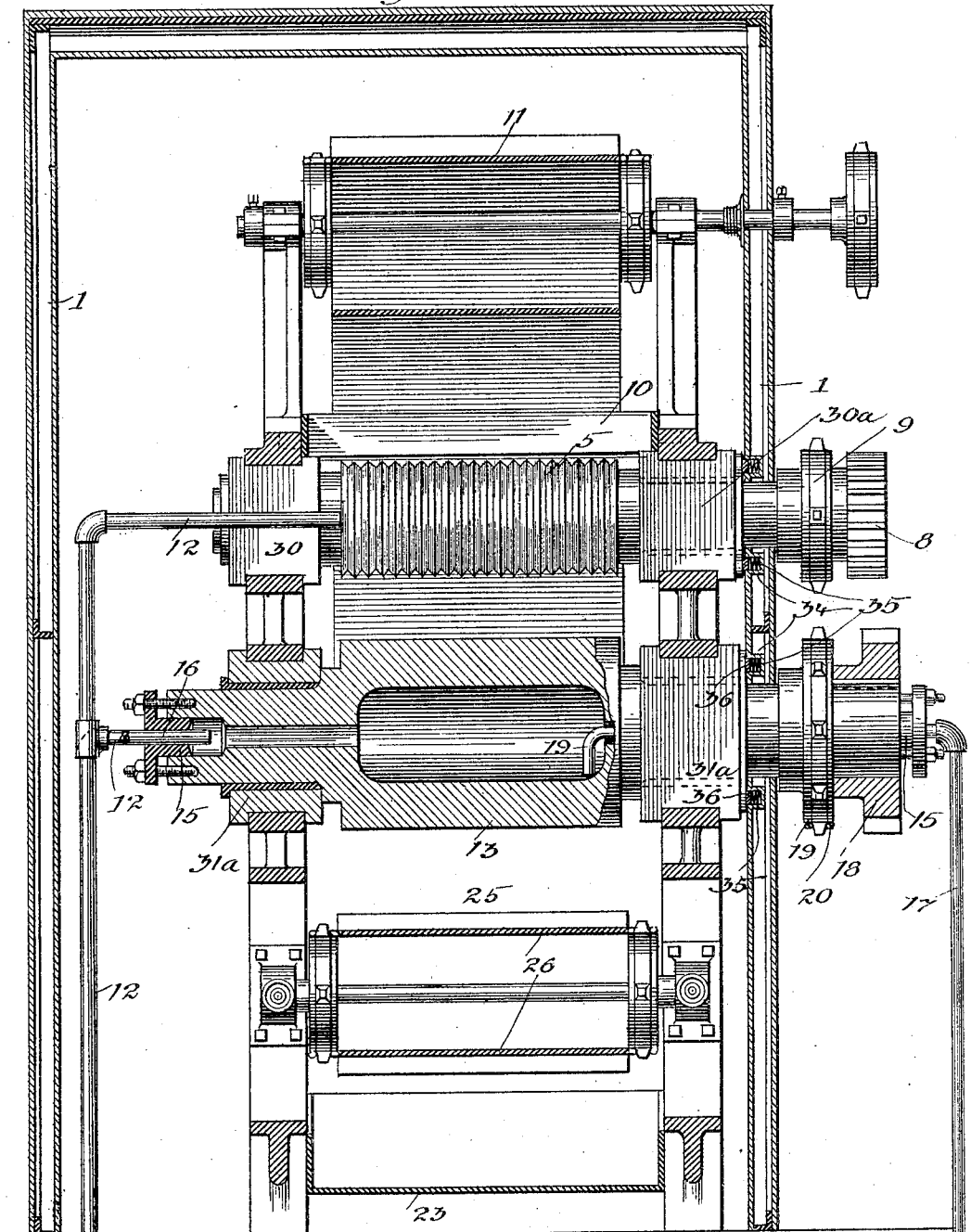

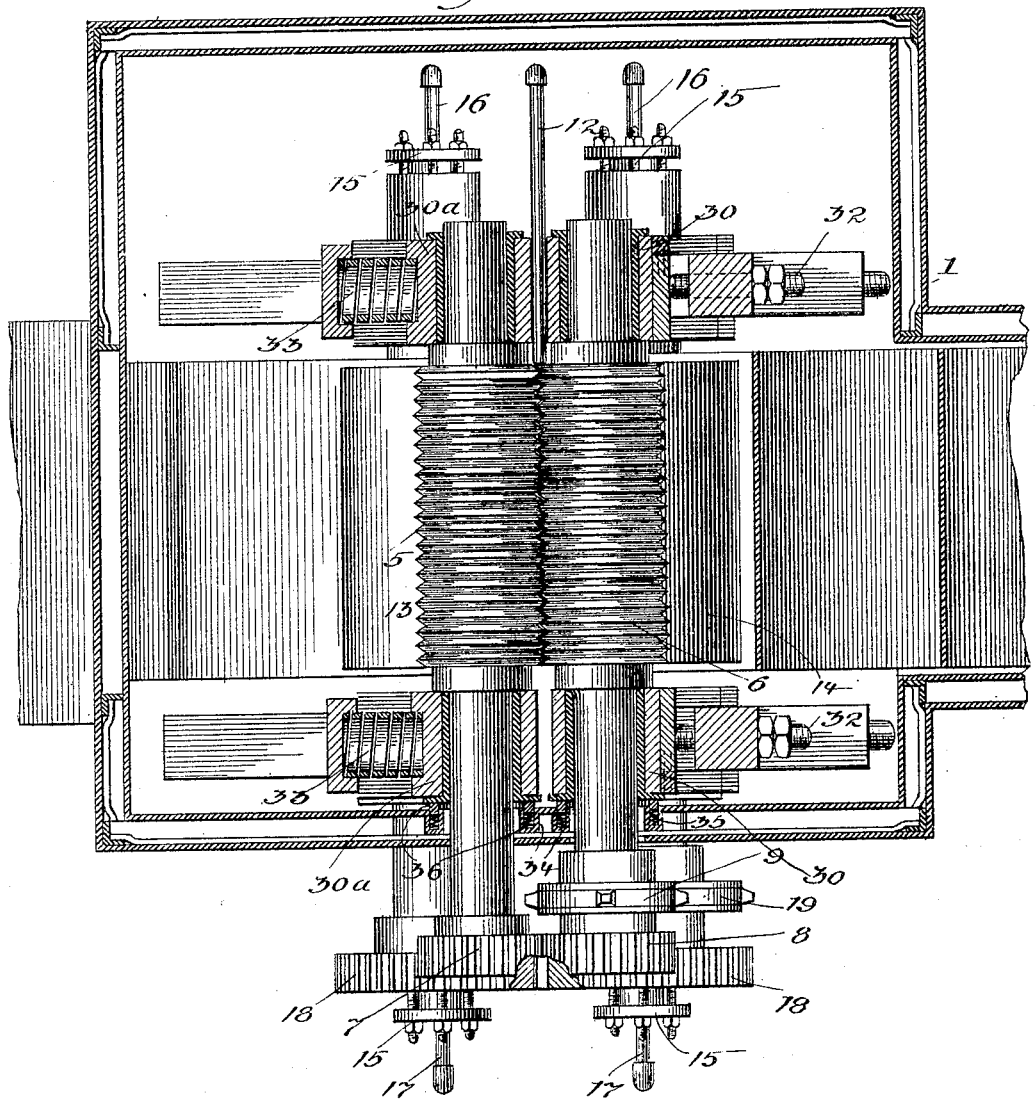

ARTHUR W. HANDFORD, OF EVANSTON, ILLINOIS, ASSIGNOR TO WOOD DISTILLATES AND FIBRE COMPANY, OF CHICAGO, ILLINOIS, A CORPORATION OF ILLINOIS.

FIBERIZER FOR REDUCING WOOD.

No. 804,313.     Specification of Letters Patent.     Patented Nov. 14, 1905.

Application filed December 27, 1904. Serial No. 238,306.

*To all whom it may concern:*

Be it known that I, ARTHUR W. HANDFORD, a citizen of the United States, residing at Evanston, in the county of Cook and State of Illinois, have invented new and useful Improvements in Fiberizers for Reducing Wood, of which the following is a specification, reference being made to the accompanying drawings, forming a part thereof.

This invention is a machine designed to be used in and as a part of an apparatus for treating wood to derive therefrom the soluble values and reduce the remainder to fiber or wood-pulp, which as an entirety is set out in my application, Serial No. 238,308, filed December 27, 1904, now pending in the United States Patent Office. The particular invention covered by this application is the fiberizing element of said apparatus—that is to say, the machine or apparatus for expressing from the fibrous residue after the preceding steps of the general process the remnants of soluble material and water and at the same time reducing the shredded wood delivered to the fiberizer to the condition of wood-pulp or wood-fiber.

It consists of the features of construction set out in the claims.

In the drawings, Figure 1 is a sectional front elevation of the fiberizing apparatus and its housing, section being made vertically through the latter to disclose the interior structure. Fig. 2 is a section at the line 2 2 on Fig. 1. Fig. 3 is a horizontal section at the line 3 3 on Fig. 1.

In the practice of the entire process of treating wood in which the present apparatus is employed it is important that the material which at the close of the process is reduced to a fibrous condition should throughout the treatment be kept inclosed—that is, so as not to be exposed to the outer air—because by such exposure there would be a loss of some portion of the more volatile products which it is the purpose of the entire process to preserve. For this reason the fiberizing apparatus, which is the subject of the present invention, is inclosed in a housing 1, and the material is delivered into said housing and to the mechanism therein for operating upon it through a conduit 2, whose cavity is continuous with that of the housing. Both the housing 1 and the conduit 2 are constructed to prevent as far as possible the loss of heat by radiation, the walls of both the housing and the conduit being made double with an air-space 3, both the inner and outer elements of the double wall being preferably made with "expanded" metal covered by concrete, as may be understood from the drawings.

The mechanism within the housing 1 comprises a frame structure 4, in which there are journaled at least two pairs of wringing or pressing rolls located one above the other, so that the material discharged from the upper pair is delivered directly to the lower pair. The rolls 5 and 6 of the upper pair are solid and circumferentially grooved, the grooves and intervening ribs being V-shaped, the ribs of one roll of the pair fitting the grooves of the opposite roll, so that the rolls interlock their respective ribs in operation. The angle of the grooves and ribs is preferably quite sharp—that is to say, less than ninety degrees—so that the coöperating faces of the ribs on the two rolls approach each other at a very acute angle as they revolve through the angular range of their intermesh, whereby the material engaged between them is rubbed or chafed for reducing the shreds to fiber in the passage. These two rolls 5 and 6 are geared together at one end by the equal gears 7 and 8 and rotated by a chain around the sprocket-wheel 9 on the shaft of one of them. The material is delivered between the rolls at their upper side through the hopper-terminal 10 of the conduit 2, in which conduit an endless conveyer 11 operates for advancing the material to the point of delivery above the hopper-mouth. The material having been exposed to treatment by heat and moisture in the preceding steps of the process, as explained in my said application, Serial No. 238,308, is delivered hot to the rolls, and the purpose of the rolls being not only to fiberize it, but also to express from it all the remaining soluble values, it is desirable to maintain the temperature and, further, to moisten the fiber, and for this purpose a steam-pipe 12, which enters the housing at any convenient point, discharges opposite one end of the interlocking area of the rolls 5 and 6, and thereby the steam is injected through the fiber as it enters between the rolls and also onto the rolls 5 and 6, so that the latter are kept hot, while the fiber itself is directly heated and moistened, thus preventing the coating of the rolls with the gummy substance which may be expressed from the fiber and which is kept in suitably liquid condition to avoid adhesion by the temperature of the rolls due to the discharge of the steam thereagainst. A branch from the same steam-pipe 12 discharges in a similar position with respect to a second pair of rolls, hereinafter more particularly described, with the same purpose and effect as to heating and moistening the fiber and assisting in heating the rolls. At the same time the discharge of the steam-pipe being outside the rolls causes the entire housing to be filled with steam at the comparatively high temperature which it is desirable to maintain, and all parts of the mechanism are thus kept hot. The fiber issuing from between the rolls 5 and 6 at the lower side passes directly between a pair of larger rolls 13 and 14. These rolls are exteriorly smooth and interiorly hollow, being mounted in their bearings in the frame by hollow trunnions at each end, these trunnions being provided with stuffing-boxes 15 15, through which steam-pipes 16 16 at one end and water-drainage pipes 17 17 at the other end communicate with the interior cavity of the rolls. The two rolls are geared together by equal gears 18 18, keyed fast on the trunnions at one end, and power for driving them is communicated by a sprocket-wheel 19, keyed fast on one of the trunnions of one of the rolls and driven by a chain, (not shown,) which communicates power from any convenient source. In order to keep the housing as free from openings or leaks as possible, the trunnions having the sprocket-wheels in both pairs of rolls are extended through the wall of the housing, where they are provided with steam-tight bearings, so that the sprocket-wheels and the driving-chains are outside the housing, and in view of the desirability of thus extending these trunnions the companion trunnions at the same ends of the other rolls are likewise extended through the wall of the housing, so that both of the steam-pipes which enter the rolls 13 and 14 at this end may be outside the housing, inasmuch as one of them must necessarily be so located. The steam discharge into the cavity of the rolls keeps the latter at the highest temperature possible with a given pressure of steam, and thereby adapts them to thoroughly liquefy any remaining gums in the fiber as it enters between the rolls which can be liquefied by such temperature, and the process of liquefaction is further assisted by the steam which pervades the entire housing and causes the fiber to be saturated with moisture when it enters between these rolls, which wring the liquids from the fiber while reducing the latter mechanically to the desired fineness. The water of condensation which accumulates within the cavity of the rolls 13 and 14 is taken up by the drainage-pipes 17 17, which for that purpose have a downwardly-extending terminal 19 within each roll reaching nearly to the bottom of the cavity thereof, so that so long as there is any water of condensation in the roll the steam will not pass directly into the drainage-pipe and the pressure of steam in the roll will always be adequate to force the water up the height of the short downwardly-extending terminal for delivery through the pipe. All the liquids expressed from the fiber, together with the water of condensation derived from the steam which pervades the housing, will be gathered in the drainage-pan 23, located at the bottom, and is excluded from the fiber delivered from the lower side of the second pair of rolls by the provision of a guide-throat or delivery-chute 25, which extends up to the lower side of said rolls 13 and 14 and gathers the fiber directly therefrom, guiding it for delivery onto an endless conveyer 26, which operates through the lower part of the housing and thence into and through a delivery-conduit 27, which extends to any suitable receptacle, in which the fiber is accumulated by the conveyer. From the drainage-pan 23 the liquids are conducted to the general drainage-pipe 46, which pertains to the entire system in which the fiberizer is an element, and said pipe conducts the liquids to any suitable receptacle or apparatus for further treatment.

The number of pairs of rolls through which the fiber is passed is regulated by experience with different sorts of wood, and I do not limit myself to the use of two pairs, as herein shown.

The rolls of the two pairs 5 and 6 and 13 and 14 are mounted in journal-boxes 30 30$^a$ and 31 31$^a$, respectively, which are slidable in the frame for permitting the rolls to approach and recede from each other. The journal-boxes 30 are adjustable in the slideways by means of bolts 32 32, set through the frame impinging against the outer side of the journal-box, and the journal-boxes 30$^a$ are held pressed yieldingly toward the opposite journal-boxes 30 by means of heavy coil-springs 33 33 reacting between the frame and the outer side of the journal-box. Precisely similar construction in respect to the second pair of rolls consists of the adjusting-screws 35 35 for the journal-boxes 31 and springs 36 36 for the journal-boxes 31$^a$.

I claim—

1. In a fiberizing apparatus in combination with a pair of rolls and a frame in which they are journaled, the rolls having circumferential intermeshing V-shaped grooves and ribs; means for rotating the rolls while thus intermeshed; means for delivering to the rolls the material to be operated upon, and a steam-discharge pipe directed for discharge of steam-jet through the material at the entering side of the rolls.

2. In a fiberizing apparatus in combination with a pair of rolls, a frame in which they are journaled and a housing which incloses the frame and rolls; a conduit whose cavity is continuous with that of the housing and which communicates therewith at the top; a conveyer in such conduit and a hopper-mouth into which such conveyer discharges, said hopper-mouth being located for directing the material to the inwardly-revolving side of the rolls; a conveyer at the lower part of the housing and an outleading conduit in which such conveyer operates and a steam-pipe leading into the housing and terminating for discharge of the steam-jet through the material at the entering side of the rolls.

3. In a fiberizing apparatus in combination with a housing, a conduit having its cavity continuous with that of the housing and communicating therewith at the top of the latter; a second conduit having its cavity continuous with the housing and communicating therewith at the bottom of the latter; a conveyer in each conduit; fiberizing-rolls and the frame in which they are mounted inclosed by the housing; means for receiving material from the conveyer in the first-mentioned conduit and guiding the same to the entering side of the rolls; means for conducting the material from the discharge side of the rolls to the second conveyer; means for heating the rolls and for discharging steam through the material at the entering side thereof.

4. In a fiberizing apparatus in combination with a housing; a plurality of pairs of fiberizing-rolls and a frame in which they are mounted inclosed by the housing, said pairs of rolls being arranged successively one pair above another in position for discharging the material operated upon from each upper to the next lower pair; a conduit leading into the upper part of the housing and a conveyer therein discharging into the housing and onto the upper pair of rolls; means for heating the rolls and for discharging steam through the material supplied thereto at the entering side of the pairs of rolls respectively.

5. In a fiberizing apparatus in combination with a housing, a plurality of pairs of fiberizing-rolls and a frame in which they are mounted inclosed by the housing, said pairs of rolls being arranged successively for delivering from each preceding pair to the next succeeding pair, the final pair of rolls in the series being hollow and having hollow trunnions, and steam-pipes extending into the hollow trunnions for discharging steam thereinto at one end; drainage-pipes extending through the hollow trunnions at the other end and having within the rolls respectively downwardly-extending terminals terminating near the lower side of the roll-cavity, and stuffing-boxes on the trunnions through which the pipes respectively extend thereinto.

In testimony whereof I have hereunto set my hand, in the presence of two witnesses, at Chicago, Illinois, this 29th day of November, 1904.

ARTHUR W. HANDFORD.

Witnesses:
FRED G. FISCHER,
M. GERTRUDE ADY.